US009529326B2

(12) United States Patent
Kroll et al.

(10) Patent No.: US 9,529,326 B2
(45) Date of Patent: Dec. 27, 2016

(54) LIGHT MODULATION DEVICE (75) Inventors: Bo Kroll, London (GB); Norbert Leister, Dresden (DE)

(73) Assignee: SEEREAL TECHNOLOGIES S.A., Munsbach (LU)

(*) Notice: Subject to any disclaimer, the term of this patent is extended or adjusted under 35 U.S.C. 154(b) by 460 days.

(21) Appl. No.: 13/997,383

(22) PCT Filed: Dec. 16, 2011

(86) PCT No.: PCT/EP2011/073150
§ 371 (c)(1),
(2), (4) Date: Jul. 17, 2013

(87) PCT Pub. No.: WO2012/084752
PCT Pub. Date: Jun. 28, 2012

(65) Prior Publication Data
US 2013/0293940 A1 Nov. 7, 2013

(30) Foreign Application Priority Data
Dec. 22, 2010 (DE) .......... 10 2010 064 006
Dec. 30, 2010 (DE) .......... 10 2010 064 383

(51) Int. Cl.
*G03H 1/08* (2006.01)
*G03H 1/10* (2006.01)
(Continued)

(52) U.S. Cl.
CPC .......... *G03H 1/2645* (2013.01); *G02F 1/1347* (2013.01); *G03H 1/02* (2013.01);
(Continued)

(58) Field of Classification Search
CPC ...... G03H 1/2294; G03H 1/02; G03H 1/2205; G03H 1/22; G03H 1/2286; G03H 1/0248; G03H 1/0486; G03H 2001/0224; G03H 2001/0858; G03H 2001/303; G03H 2001/2297; G03H 2002/0421; G03H 2001/2234; G03H 2001/2276; G03H 2001/2655; G03H 2225/55; G03H 2225/33; G03H 2225/22; G03H 2225/60; G03H 2225/25; G03H 2225/23; G03H 2225/34; G03H 2210/30; G03H 2210/10; G03H 2222/22; G03H 2222/31; G03H 2223/18; G03H 2223/20; G03H 2223/23; G03H 2240/13; G03H 2240/61; G03H 2250/38; G02B 27/26; G02B 27/2214; G02B 27/225; G02B 27/283; G02B 27/126; G02B 27/22; G02B 27/2264; G02B 5/3083; G02B 5/32; G02B 5/1833; G02B 26/0808; G02B 19/0014; G02B 6/0036; G02B 6/0056; H04N 13/0409; H04N 13/0048; H04N 13/0055; H04N 13/0434; H04N 13/0438; H04N 13/0411; H04N 13/0059; H04N 13/0217; H04N 13/0497; H04N 13/004; H04N 13/0051; H04N 13/021; H04N 13/0214; H04N 5/7441; H04N 2013/0465; G02F 2413/09; G02F 1/1335; G02F 1/133753; G02F 1/13363; G02F 1/292; G02F 1/13342; G02F 1/133636; G02F 1/1347; G02F 2001/133638; G02F 2203/12
(Continued)

(56) References Cited

U.S. PATENT DOCUMENTS 5,264,964 A * 11/1993 Faris .............. 359/465
5,537,144 A * 7/1996 Faris .............. 348/58
(Continued)

FOREIGN PATENT DOCUMENTS

DE  10 2007 063 382 A1  7/2009
WO  2006/027228 A1     3/2006
(Continued)

OTHER PUBLICATIONS

International Search Report, dated Mar. 30, 2012, and Written Opinion, issued in International Application No. PCT/EP2011/073150 (in both German and English).

*Primary Examiner* — Bumsuk Won
*Assistant Examiner* — Collin X Beatty
(74) *Attorney, Agent, or Firm* — Saul Ewing LLP (57) ABSTRACT

The present invention relates to a light modulator device with a spatial light modulator, a structured polarizer means, a controllable polarization means and a light wave multi-
(Continued)

(A) 1. operational situation (B) 2. operational situation plexing means. The spatial light modulator comprises discretely addressable modulator cells. Two modulator cells each are combined to form a modulation element. The modulator cells modulate light waves which are capable of generating interference of a propagating light wave field with holographic information in a spatially structured way such that a specifiable spatial distribution of object light points of a three-dimensional scene is holographically reconstructed. The modulator cells of each modulation element are adjacently arranged regarding the direction of propagation of the light wave field. The light which is modulated by adjacently arranged modulator cells is given different polarization states by the structured polarizer means.

22 Claims, 7 Drawing Sheets (51) Int. Cl.
  G03H 1/12 (2006.01)
  G03H 1/26 (2006.01)
  G02F 1/1347 (2006.01)
  G03H 1/02 (2006.01)
  G02F 1/1335 (2006.01)
  G02F 1/13363 (2006.01)
  G03H 1/22 (2006.01)

(52) U.S. Cl.
  CPC ............. *G03H 1/2294* (2013.01); *G02F 2001/133538* (2013.01); *G02F 2001/133541* (2013.01); *G02F 2001/133638* (2013.01); *G02F 2413/09* (2013.01); *G03H 1/2205* (2013.01); *G03H 2001/0224* (2013.01); *G03H 2001/2297* (2013.01); *G03H 2001/2655* (2013.01); *G03H 2223/18* (2013.01); *G03H 2223/19* (2013.01); *G03H 2223/20* (2013.01); *G03H 2225/33* (2013.01); *G03H 2225/55* (2013.01); *G03H 2240/56* (2013.01)

(58) Field of Classification Search
  USPC ....... 359/9, 15, 238, 32, 249, 253, 256, 279, 359/462, 464, 11, 23, 250, 251, 259, 272, 359/276, 320, 485.05, 485.07, 489.15, 10; 348/E13.03, E13.04, E13.072, 40, 348/E13.073, 42, 57; 349/117, 15, 1, 193; 345/419
  See application file for complete search history.

(56) References Cited

U.S. PATENT DOCUMENTS

| | | | | |
|---|---|---|---|---|
| 5,844,717 | A * | 12/1998 | Faris | 359/486.02 |
| 5,973,817 | A * | 10/1999 | Robinson et al. | 359/247 |
| 6,111,598 | A * | 8/2000 | Faris | 348/57 |
| 6,248,487 | B1 * | 6/2001 | Cohn et al. | 430/30 |
| 6,285,473 | B1 * | 9/2001 | Nishi et al. | 359/15 |
| 6,753,990 | B1 * | 6/2004 | Payne et al. | 359/22 |
| 2002/0180659 | A1 * | 12/2002 | Takahashi | 345/4 |
| 2004/0240009 | A1 * | 12/2004 | Schwerdtner | 359/15 |
| 2005/0111100 | A1 * | 5/2005 | Mather et al. | 359/464 |
| 2006/0050340 | A1 * | 3/2006 | Schwerdtner et al. | 359/15 |
| 2006/0164578 | A1 * | 7/2006 | Matsumoto et al. | 349/117 |
| 2008/0170183 | A1 * | 7/2008 | Sugiyama | 349/96 |
| 2009/0009668 | A1 * | 1/2009 | Tan et al. | 349/1 |
| 2009/0040426 | A1 * | 2/2009 | Mather et al. | 349/65 |
| 2010/0046049 | A1 * | 2/2010 | Kroll et al. | 359/9 |
| 2010/0103485 | A1 * | 4/2010 | Haussler | 359/9 |
| 2010/0118117 | A1 * | 5/2010 | Kroll et al. | 348/40 |
| 2010/0149617 | A1 * | 6/2010 | Kroll et al. | 359/249 |
| 2010/0194854 | A1 * | 8/2010 | Kroll et al. | 348/40 |
| 2010/0225876 | A1 * | 9/2010 | Escuti et al. | 349/187 |
| 2010/0265558 | A1 * | 10/2010 | Leister et al. | 359/246 |
| 2010/0277779 | A1 * | 11/2010 | Futterer et al. | 359/9 |
| 2011/0063289 | A1 * | 3/2011 | Gantz | 345/419 |
| 2011/0103409 | A1 * | 5/2011 | Sipes, Jr. | 372/6 |
| 2011/0122467 | A1 * | 5/2011 | Futterer et al. | 359/9 |
| 2012/0086994 | A1 * | 4/2012 | Choi et al. | 359/9 |
| 2012/0092735 | A1 * | 4/2012 | Futterer et al. | 359/11 |
| 2012/0092750 | A1 * | 4/2012 | Kroll et al. | 359/291 |
| 2013/0100333 | A1 * | 4/2013 | Awatsuji et al. | 348/335 |
| 2013/0335795 | A1 * | 12/2013 | Song et al. | 359/9 |
| 2014/0055692 | A1 * | 2/2014 | Kroll et al. | 349/15 |

FOREIGN PATENT DOCUMENTS

| | | | |
|---|---|---|---|
| WO | WO 2006027228 A1 * | 3/2006 | |
| WO | 2006/066919 A1 | 6/2006 | |
| WO | 2009/050294 A2 | 4/2009 | |
| WO | WO 2009050294 A2 * | 4/2009 | |
| WO | 2010/149588 A1 | 12/2010 | |

* cited by examiner (A) 1. operational situation (B) 2. operational situation

FIG. 1

(A) 1. operational situation (B) 2. operational situation

LIGHT MODULATION DEVICE

CROSS REFERENCE TO RELATED APPLICATIONS

This application claims the priority of PCT/EP2011/073150, filed on Dec. 16, 2011, which claims priority to German Application No. 10 2010 064 006.9, filed Dec. 22, 2010 and German Application No. 10 2010 064 383.1, filed Dec. 30, 2010, the entire contents of each of which are hereby incorporated in total by reference.

BACKGROUND OF THE INVENTION

The present invention relates to a light modulator device with a spatial light modulator, a structured polariser means, a controllable polarisation means and a light wave multiplexing means. The spatial light modulator comprises discretely addressable modulator cells. Two modulator cells each are combined to form a modulation element. The modulator cells modulate light waves which are capable of generating interference of a propagating light wave field with holographic information in a spatially structured way such that a specifiable spatial distribution of object light points of a three-dimensional scene is holographically reconstructed. The modulator cells of each modulation element are arranged adjacently regarding the direction of propagation of the light wave field. The light which is modulated by adjacently arranged modulator cells is given different polarisation states by the structured polariser means. For this, a modulator cell or each modulator cell can preferably be assigned with a region on the structured polariser means. The structured polariser means could for example be designed such that it has regions with different polarisation properties. Such a region could have a dimension that corresponds substantially with the cross-sectional area of the modulator cell or column or line of modulator cells which is assigned to that region. The light wave multiplexing means is disposed and designed such that the different light wave portions—after having been modulated by the modulator cells and having different polarisation states—are combined on its exit side to form a modulated light wave multiplex such that the modulated light wave multiplex leaves the light wave multiplexing means substantially though a common point and substantially in the same direction of propagation.

A light modulator device of the aforementioned type is known for example from the international patent application no. WO 2010/149588 A1. The light modulator device described there comprises light wave multiplexing means which are disposed and designed such that the different light wave portions—after having been modulated by the modulator cells and having different polarization states—are combined on its exit side to form a modulated light wave multiplex such that the modulated light wave multiplex leaves the light wave multiplexing means substantially though a common point and substantially in the same direction of propagation. Thanks to this, it is possible to preferably use spatial light modulators which serve for example to modulate the phase of the light which passes through one modulator cell in a specifiable different way than the phase of the light which passes through another, adjacent modulator cell. If the light which passes through the adjacent modulator cells can be spatially superimposed and combined to form a light wave multiplex which propagates substantially in the same direction of propagation, then the light wave multiplex which comprises the light which has passed through the adjacent modulator cells can serve as a complex hologram value with which a three-dimensional scene can be holographically reconstructed. In the light modulator device according to WO 2010/149588 A1, in particular for a holographic display with single-parallax encoding (1d), the modulator cells of adjacent lines or columns of a spatial light modulator are combined such that corresponding lines of modulation elements or columns of modulation elements are formed. The resolution of the three-dimensional scene which can be achieved with such a display can be chosen freely. In the direction which is perpendicular to the latter, that is in the sweet spot direction, the scene resolution is limited by the number of modulator cells of the spatial light modulator (SLM) in that direction. As a result, however, the resolution of the three-dimensional scene which is to be displayed is lower in the direction which is perpendicular to the respective line or column of modulation elements. Without prejudice to the generality of the invention, it is assumed hereinafter that a vertical parallax only encoding is used. Then, the scene resolution can be chosen freely in the vertical direction, whereas it is limited by the number of pixel columns in the horizontal direction. Since the inventive light modulator device described hereafter can form a continuation of the light modulator device described in document WO 2010/149588 A1, and since reference is made hereinafter to the light modulator device described in document WO 10 2010/149588 A1, this document is fully incorporated herein by reference.

If the holographic display comprises a spatial light modulator whose modulator cells can modulate the phase of the light which interacts with the modulator cells and a light wave multiplexing means with the function of combining light which passes through two modulator cells to form a complex-valued light wave multiplex, then the scene resolution is halved compared with the number of columns of modulation elements.

It is therefore the object of the present invention to provide and to advance a light modulator device of the aforementioned type such to overcome the aforementioned problems. It shall in particular be avoided that the resolution of the reconstructed three-dimensional scene is reduced as light of adjacent modulator cells is combined.

The object is solved according to this invention through the teachings of claim 1. Further preferred embodiments and continuations of the present invention are defined in the dependent claims.

According to this invention, the light modulator device of the aforementioned type is characterised in that in a first operational situation of the controllable polarisation means light wave portions of two adjacent modulator cells are combined by the light wave multiplexing means, whereas in a second operational situation of the controllable polarisation means light wave portions of two other adjacent modulator cells are combined by the light wave multiplexing means.

According to this invention, it has first been found that the scene resolution can in particular be prevented from being halved when two holograms or two three-dimensional scenes are shown sequentially in one direction, in particular in the incoherent direction, by using a light wave multiplexing means which would work in a polarisation-sensitive mode. This can be achieved by switching the controllable polarisation means, whereby the polarisation of the light is changed before it passes through the light wave multiplexing means, so that the light wave portions of two adjacent modulator cells are combined by the light wave multiplexing means in the first operational situation of the controllable polarisation means, and that the light wave portions of two other adjacent modulator cells are combined by the light wave multiplexing means in the second operational situation of the controllable polarisation means. Here, the two other adjacent modulator cells can be offset by one modulator cell from the two adjacent modulator cells. Thanks to this measure, a first and a second three-dimensional scene are reconstructed on the exit side of the light wave multiplexing means which are usually offset by one column or line of modulator cells. To give an example, the modulator cells of columns 1 and 2, the modulator cells of columns 3 and 4, and so forth, are each combined to form a complex value for the three-dimensional scene which is shown first. Then, the modulator cells of columns 2 and 3, the modulator cells of columns 4 and 5, and so forth, are each combined to form a complex light wave multiplex for the three-dimensional scene which is shown thereafter.

This way, the light modulator device according to this invention preferably allows the resultant scene resolution to be doubled compared with the light modulator device known from document WO 2010/149588 A1.

SUMMARY OF THE INVENTION

In a preferred embodiment of the present invention, the light wave field which illuminates the light modulator device is polarised. The structured polariser means is designed such that it realises the optical function of a retardation plate, in particular that of a $\lambda/2$ plate or $\lambda/4$ plate, at least for a first portion of the light which is modulated by the adjacently arranged modulator cells. The structured polariser means has the optical function of a $\lambda/2$ plate in particular at the time when the spatial light modulator and the light wave multiplexing means are designed for the same kind of polarisation, e.g. linear or circular polarisation. The structured polariser means has the optical function of a $\lambda/4$ plate in particular at the time when the spatial light modulator and the light wave multiplexing means are designed for different kinds of polarisation, e.g. linear and circular polarisation.

The polarisation of the light which is modulated by the adjacently arranged modulator cells can insofar be modified by the structured polariser means. In co-action with the controllable polarisation means, the light which is modulated by different adjacent modulator cells can be combined. In this context, a structured polariser means shall in particular be understood to be a structured polariser means which comprises first spatial regions and second spatial regions which give the light which interacts with the structured polariser means certain specifiable polarisations, where the first spatial regions could be assigned to one class of modulator cells (e.g. line or column) and the second spatial regions could be assigned to another class of modulator cells.

The light which passes through a first modulator cell is preferably given a specifiable first polarisation by the structured polarisation means. The light which passes through a second modulator cell is given a specifiable second polarisation. The specifiable first polarisation is linear and perpendicular to a specifiable second linear polarisation. Alternatively, the specifiable first polarisation is circular and has an opposing sense of rotation as a specifiable second circular polarisation.

The light wave field which illuminates the light modulator device could be linear or circular polarised.

The controllable polarisation means could comprise an optical component based on liquid crystals which gives the light which interacts with the controllable polarisation means a specifiable polarisation. This is preferably done in a plane, since a selective change in polarisation of the light in the plane of the modulator cells is not imperative.

Now, a number of embodiments of the light wave multiplexing means will be described which can be used in conjunction with the present light modulator device according to this invention.

According to a first embodiment, the light wave multiplexing means could comprise a birefringent medium which is designed and arranged such that the light which passes through a first modulator cell is substantially not deflected while the light which passes through a second modulator cell leaves the birefringent medium with a lateral offset, so that the light portions are combined on its exit side to form a modulated light wave multiplex such that the modulated light wave multiplex leaves the birefringent medium substantially through a common point and substantially in the same direction of propagation. The birefringent medium is preferably designed in the form of a coplanar birefringent plate or layer. The birefringent medium could be followed by another birefringent medium having a dispersion which is suitable for chromatic correction.

In another embodiment, the birefringent medium could be followed in the direction of light propagation by a further birefringent medium. The birefringent medium is designed and arranged such that the light which passes through a first modulator cell is substantially not deflected while the light which passes through a second modulator cell leaves the birefringent medium with a lateral offset. The further birefringent medium is designed and arranged such that the light which passes through the second modulator cell is substantially not deflected while the light which passes through the first modulator cell leaves the birefringent medium with a lateral offset, so that the light portions are combined on the exit side of the further birefringent medium to form a modulated light wave multiplex such that the modulated light wave multiplex leaves the further birefringent medium substantially through a common point and substantially in the same direction of propagation. The further birefringent medium could have a dispersion which is suitable for chromatic correction of the light which passes through the two birefringent media.

The at least two birefringent media could have substantially coplanar interfaces. Alternatively or additionally, a retardation plate, which is preferably designed in the form of a $\lambda/2$ plate, could be disposed between the two birefringent media.

In the first and second embodiment described above, the polarisation properties of the light wave field, of the structured polariser means and of the controllable polarisation means, and the optical properties of the birefringent medium or of the birefringent media shall be chosen such that the desired effect is realised, namely that the modulated light wave multiplex which combines the light that has been modulated by two adjacent modulator cells leaves the light modulator device through a common point and substantially in the same direction of propagation.

In a third embodiment, the light wave multiplexing means comprises a first deflection layer. The first deflection layer is followed in the direction of light propagation by a second deflection layer at a specifiable distance. The optical property of the first deflection layer could be chosen such that the light which passes through the first modulator cell is substantially not deflected while the light which passes through the second modulator cell is deflected by a first specifiable angle. The optical property of the second deflection layer is chosen such that the light which passes through the first modulator cell is substantially not deflected while the light which passes through the second modulator cell is deflected by a second specifiable angle. The absolute value of the second specifiable angle could be substantially identical to the absolute value of the first specifiable angle. Accordingly, the third embodiment with the two deflection layers generally compares to the first embodiment, which features a birefringent medium.

According to a fourth embodiment, the optical property of the first deflection layer is chosen such that the light which passes through the first modulator cell is deflected by a first specifiable angle into a first direction while the light which passes through the second modulator cell is deflected by a second specifiable angle into a second direction. The optical property of the second deflection layer is chosen such that the light which passes through the first modulator cell is deflected by the second angle while the light which passes through the second modulator cell is deflected by the first angle. The absolute value of the first angle could be substantially identical to the absolute value of the second angle.

According to a fifth embodiment, the light wave multiplexing means comprises a first birefringent prism array and a second birefringent prism array. The first birefringent prism array is designed and arranged such that the light which passes through a first modulator cell can be deflected into a first direction. The light which passes through a second modulator cell is not deflected. The first birefringent prism array is followed in the direction of light propagation by the second birefringent prism array at a specifiable distance. The second birefringent prism array is designed and arranged such that the light which is deflected by the first birefringent prism array can be deflected into a specifiable direction by the second birefringent prism array and that the light which is not deflected by the first birefringent prism array is not deflected by the second birefringent prism array either. The first and second birefringent prism array could also be of a switchable type, for example through liquid crystals which are embedded in a prism-array-shaped medium, where the liquid crystals can be controlled electronically such that the polarisation state of the light which passes through the birefringent prism array is changed by the switchable birefringent prism array in one operational situation of the switchable birefringent prism array while the polarisation state of that light remains unchanged in another operational situation.

In the third to fifth embodiment, a deflection layer can be a layer that comprises a hologram and/or a volume grating and/or a Bragg grating, or a polarisation grating.

According to a particularly preferred embodiment, two adjacent modulator cells which are situated side by side horizontally are each combined to form a modulation element such to form a column of modulation elements. According to an alternative embodiment, two adjacent modulator cells which are situated one above the other vertically are each combined to form a modulation element such to form a line of modulation elements.

As far as the arrangement of the optical components of the light modulator device are concerned, the following possibilities are provided:

The controllable polarisation means could be disposed upstream of the light wave multiplexing means, seen in the direction of light propagation. Alternatively or additionally, the structured polariser means could be disposed upstream of the light wave multiplexing means, seen in the direction of light propagation. The controllable polarisation means could be disposed upstream or downstream of the structured polariser means, seen in the direction of light propagation.

According to a particularly preferred embodiment, the controllable polarisation means can be brought to the first operational situation for the duration of one frame. The controllable polarisation means can be brought to the second operational situation for the duration of the subsequent frame. The spatial light modulator could be encoded or information could be written to it depending on the actual operational situation of the controllable polarisation means.

In a preferred embodiment, the structured polariser means is of a controllable type, thus taking over the function of the controllable polarisation means. In that case, the light modulator device does not comprise the structured polariser means and the controllable polarisation means, but just one optical component, namely a controllable structured polarisation means.

The light wave multiplexing means is preferably followed in the direction of light propagation by a polarisation means with specifiable optical property which serves as an analyser. The light thus leaves the light modulator device with a defined polarisation state, which can be necessary for a light deflection means which may follow the light modulator device.

The distance between the spatial light modulator and the structured polariser means is preferably chosen very small. It then makes sense to perform the plane switching of the polarisation of the light wave field which illuminates the spatial light modulator with the controllable polarisation means already before the light passes the spatial light modulator, so for example in an illumination device for the light modulator device.

Those LC modes which realise a phase modulation for different input polarisations are preferably used in the spatial light modulator. This is the case for example for in-plane modulating LC modes with circular polarisation. They would effect a phase modulation for both left-handed circular polarised light and right-handed circular polarised light. The phase values for a fix LC orientation differ depending on the orientation of the circular polarisation. However, this can be taken into account when writing the hologram to the spatial light modulator.

Switching the polarisation of the light wave field can also be performed downstream of the structured polariser means and before the light enters the light wave multiplexing means.

The light modulator device according to this invention can be used in particular when realising a holographic display, for example as known from documents WO 2006/066919 A1 or WO 2006/027228 A1, the entire contents of each of which being fully incorporated herein by reference.

BRIEF DESCRIPTION OF THE DRAWINGS

Now, there are a number of possibilities for embodying and continuing the teachings of the present invention. To this end, reference is made on the one hand to the dependent claims that follow claim 1, and on the other hand to the description of the preferred embodiments of this invention below including the accompanying drawings. Generally preferred physical forms and continuations of the teaching will be explained in conjunction with the description of the preferred embodiments of the invention and the accompanying drawings. The Figures are schematic drawings, where

Identical or comparable parts are given like reference symbols in all the Figures.

DETAILED DESCRIPTION OF THE INVENTION

Figure 1:
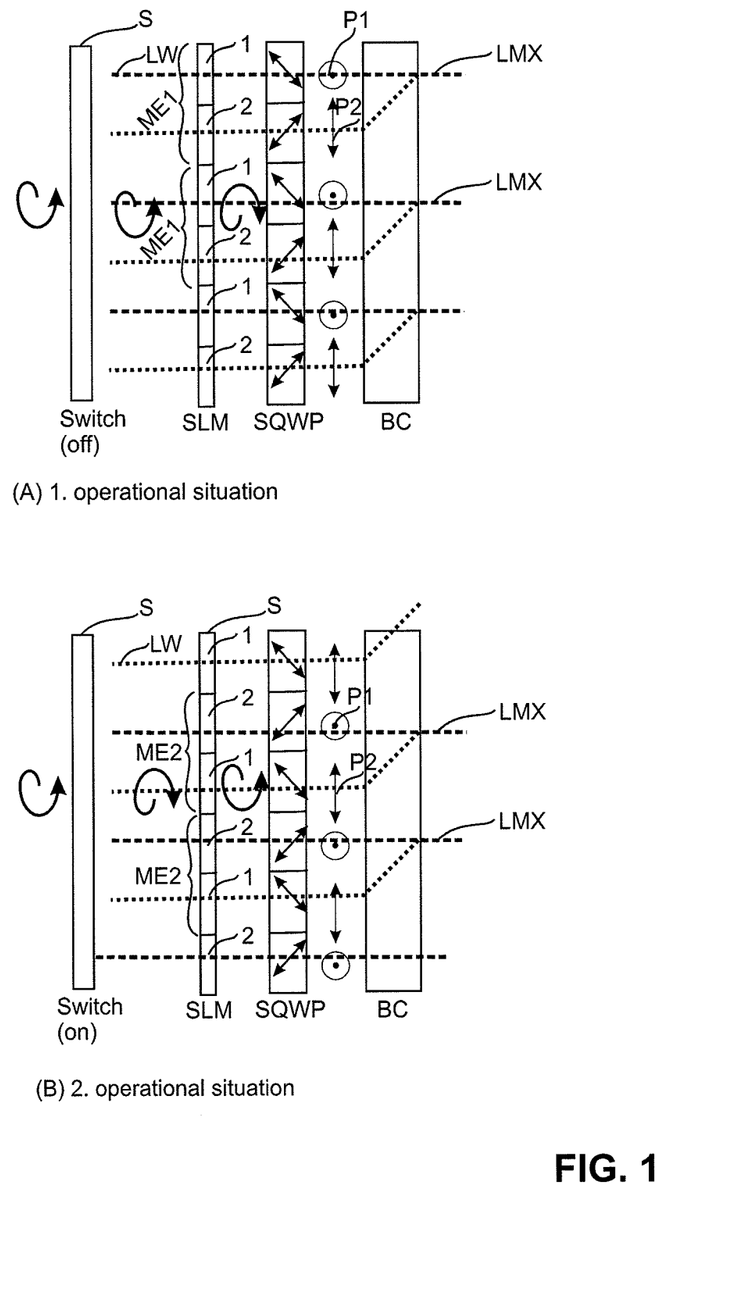
FIG. 1 illustrates a first embodiment of the present invention, where the top drawing shows the light modulator device in a first operational situation and the bottom drawing shows the same light modulator device in a second operational situation.

FIG. 1 is a top view that shows a first embodiment of the light modulator device, where the spatial light modulator SLM is of a transmission type. The collimated light wave field which is emitted by the light source (not shown in FIG. 1) and which comes from the left-hand side in the drawing has a circular polarisation as indicated by the circular arrow. The following components are disposed one after another in the direction of light propagation: first the controllable polarisation means S, then the spatial light modulator SLM, then the structured polariser means SQWP, and finally the light wave multiplexing means BC. A circular polarisation of the light is always indicated by a circular arrow in the drawings, and the direction of rotation of the arrow hints at whether the circular polarisation is oriented clockwise (right-handed) or counter-clockwise (left-handed).

The spatial light modulator SLM uses the working principle of in-plane modulation of the liquid crystal molecules, as is described for example in document WO 2011/039286 A1. The structured polariser means SQWP is designed such that it realises the optical function of a structured λ/4 plate. This means that the structured polariser means SQWP alternately generates for adjacent modulator cells 1, 2 a horizontal and a vertical polarisation of the light which passes through it. This is indicated in FIG. 1 by a double arrow on the one hand and by a circle with centre dot on the other.

The light wave multiplexing means BC selectively gives the light with a linear polarisation P2 a lateral offset, but not the light with the other linear polarisation P1. The light wave multiplexing means BC thus generates a lateral offset for light whose direction of polarisation lies in the drawing plane (see double arrow for P2). Light with a direction of polarisation that is perpendicular to the drawing plane is not given any lateral offset by the light wave multiplexing means BC. This light passes through the light wave multiplexing means BC without being deflected. The light wave multiplexing means can for example be a device as shown in FIGS. 3-10.

FIG. 1 shows schematically six modulator cells 1, 2 of the spatial light modulator SLM, where the shown detail only illustrates a part of the entire spatial light modulator. The spatial light modulator SLM and the other components shown in FIG. 1 shall be imagined continuing upwards, downwards and out of the drawing plane. In the operational situation of the light modulator device shown in the top drawing in FIG. 1, the light wave multiplexing means BC combines light of each pair of modulator cells 1, 2 to form a modulation element ME1.

The entry polarisation of the light wave field can be modified by accordingly controlling the controllable polarisation means S by a control unit (not shown). In the operational situation of the light modulator device shown in the top drawing of FIG. 1, the controllable polarisation means S is switched off, so that the entry polarisation of the light wave field propagates towards the spatial light modulator SLM without being changed. In the operational situation of the light modulator device shown in the bottom drawing of FIG. 1, the controllable polarisation means S is switched on, so that the entry polarisation of the light wave field is changed before it propagates towards the spatial light modulator SLM. In contrast to the former operational situation, the polarisation of the light downstream of the structured polariser means SQWP is offset by one modulator cell. As a consequence, the light wave multiplexing means BC combines light of the modulator cells 2, 1 each to form a modulation element ME2.

Encoding the spatial light modulator SLM is adapted to the operational situations of the controllable polarisation means SQWP and light modulator device such that the phase values for the respective hologram are also written to the mutually assigned combined modulation elements ME1, ME2, or to the columns of modulation elements. The light which leaves the light wave multiplexing means BC, namely the light wave multiplex LMX, is always offset by one column of modulation elements.

This way, the light modulator device according to this invention preferably allows in general the resultant spatial scene resolution to be doubled, namely by way of switching the polarisation of the light in conjunction with writing adapted hologram information.

The controllable polarisation means S can for example be designed in the form of a liquid crystal layer which is addressed by plane electrodes. FIG. 1 shows an arrangement with a transmission-type spatial light modulator SLM. However, the inventive concept can also be applied to a reflection-type spatial light modulator SLM, as shown in FIG. 2.

Figure 2:
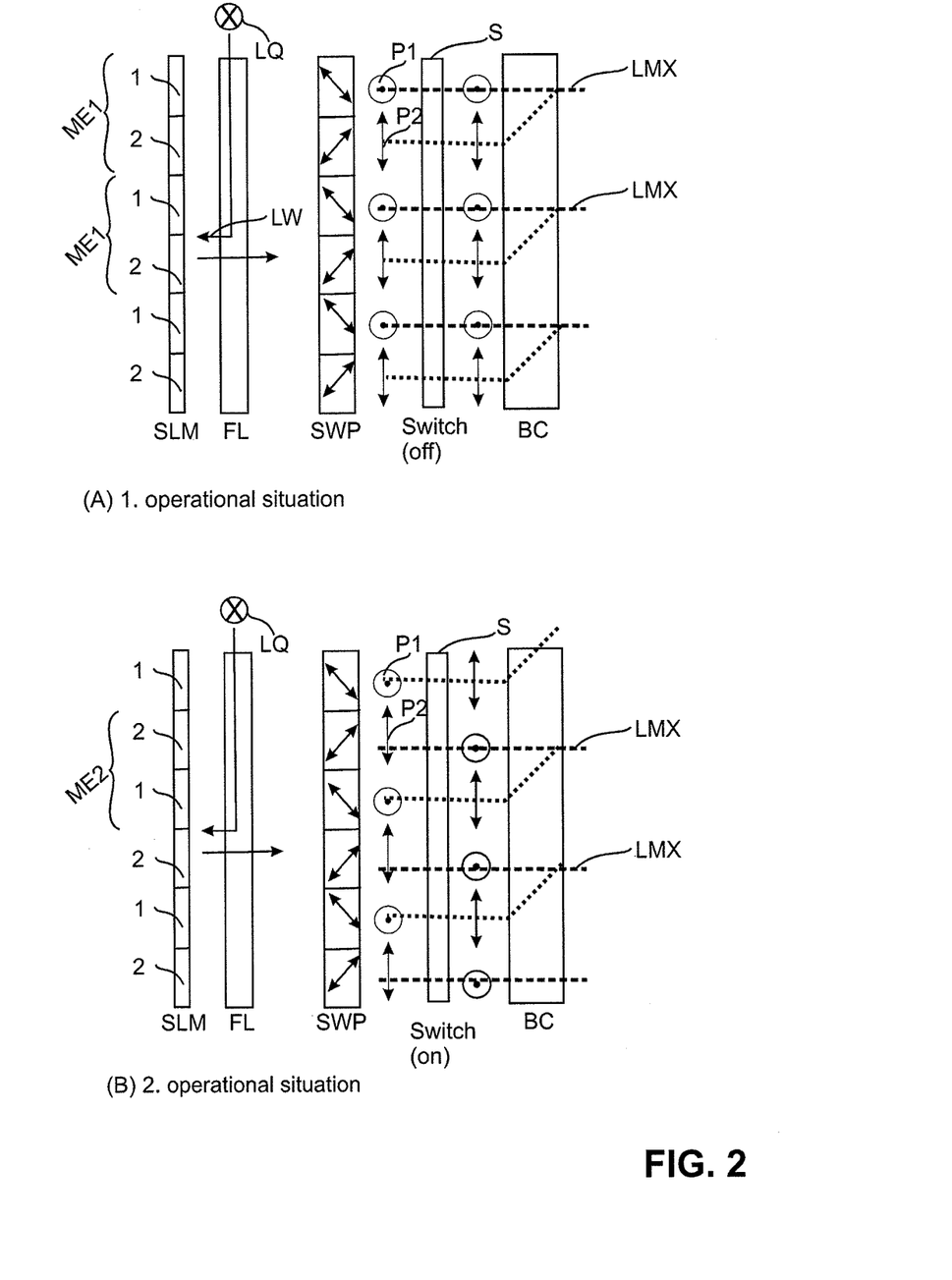
FIG. 2 illustrates a second embodiment of the present invention where the top drawing shows the light modulator device in a first operational situation and the bottom drawing shows the same light modulator device in a second operational situation, and FIGS. 3-10 each show an embodiment of a light wave multiplexing means.

FIG. 2 is a top view which shows an embodiment of a reflective arrangement, where the polarisation of the light is only switched after the light has passed through the structured polariser means SWP.

In this embodiment, the light which is emitted by the light source LQ is coupled into an illumination device FL. The illumination device FL is preferably designed as described in document WO 2010/149583 A1, where the injected light is coupled out towards the reflection-type spatial light modulator SLM in the form of a plane light wave field LW. There, the light wave field LW is modulated by the modulator cells 1, 2 of the spatial light modulator SLM and reflected towards the illumination device FL such that the light which has been modulated by the modulator cells 1, 2 passes through the illumination device FL substantially without being deflected. The polarisation of the light is changed accordingly by the structured polariser means SWP, namely in a way that compares with what has been said under FIG. 1. This means that the light has either a linear polarisation towards the drawing plane (double arrow, P2) or perpendicular to the drawing plane (circle with centre dot, P1) after its passage through the structured polariser means SWP. The light wave multiplexing means BC again combines light which has been modulated by the modulator cells 1, 2 to form a modulation element ME1 (see the operational situation of the light modulator device shown in the top drawing of FIG. 2), or it combines light which has been modulated by the modulator cells 2, 1 to form a modulation element ME2 (see the operational situation of the light modulator device shown in the bottom drawing of FIG. 2).

The invention shall not be limited to the embodiments described herein. In particular, other combinations of reflective or transmissive arrangements and other sequences of controllable polarisation means, spatial light modulator and structured polariser means are possible.

FIGS. 3-10 show embodiments of light wave multiplexing means which can be used in the light modulator device according to this invention. These light wave multiplexing means are largely included in the international patent application no. WO 2010/149588 A1 and generally serve as light wave multiplexing means in the manner described in that document. Insofar, reference is made in this respect to document WO 2010/066919 A1.

Figure 3:
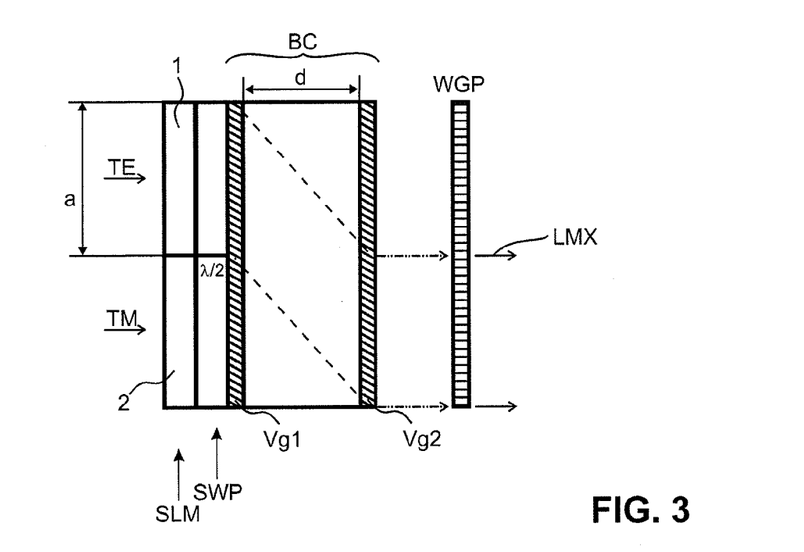

FIG. 3 is a top view which shows a detail of a light wave multiplexing means BC, a detail of the spatial light modulator SLM with two modulator cells 1, 2 and a detail of the structured polariser means SWP.

Referring to FIG. 3, a λ/2 plate is drawn between the modulator cell 2 and the volume grating Vg1. Providing a λ/2 plate becomes necessary when the light which falls on the modulator cells 1, 2 only has one specifiable polarisation, e.g. a linear TE polarisation. In that case, the polarisation of the light which passes through the modulator cell 2 is turned by the λ/2 plate by 90 degrees, so that the light which passes through the modulator cell 1 is given a polarisation that is perpendicular to that of the light which passes through the modulator cell 2. If the light which falls on the modulator cells 1, 2 already has a perpendicular polarisation, the provision of a λ/2 plate between the modulator cell 2 and the volume grating Vg1 is not necessary. In other words, it is important that the light which passes through the modulator cell 1 has a different—e.g. perpendicular—polarisation than the light which passes through the modulator cell 2, so that the light which passes through one modulator cell is deflected by the volume grating Vg1, and the light which passes through the other modulator cell is not deflected by the volume grating Vg1. What has been said above also applies to FIGS. 6-10 in a similar way.

Figure 4:
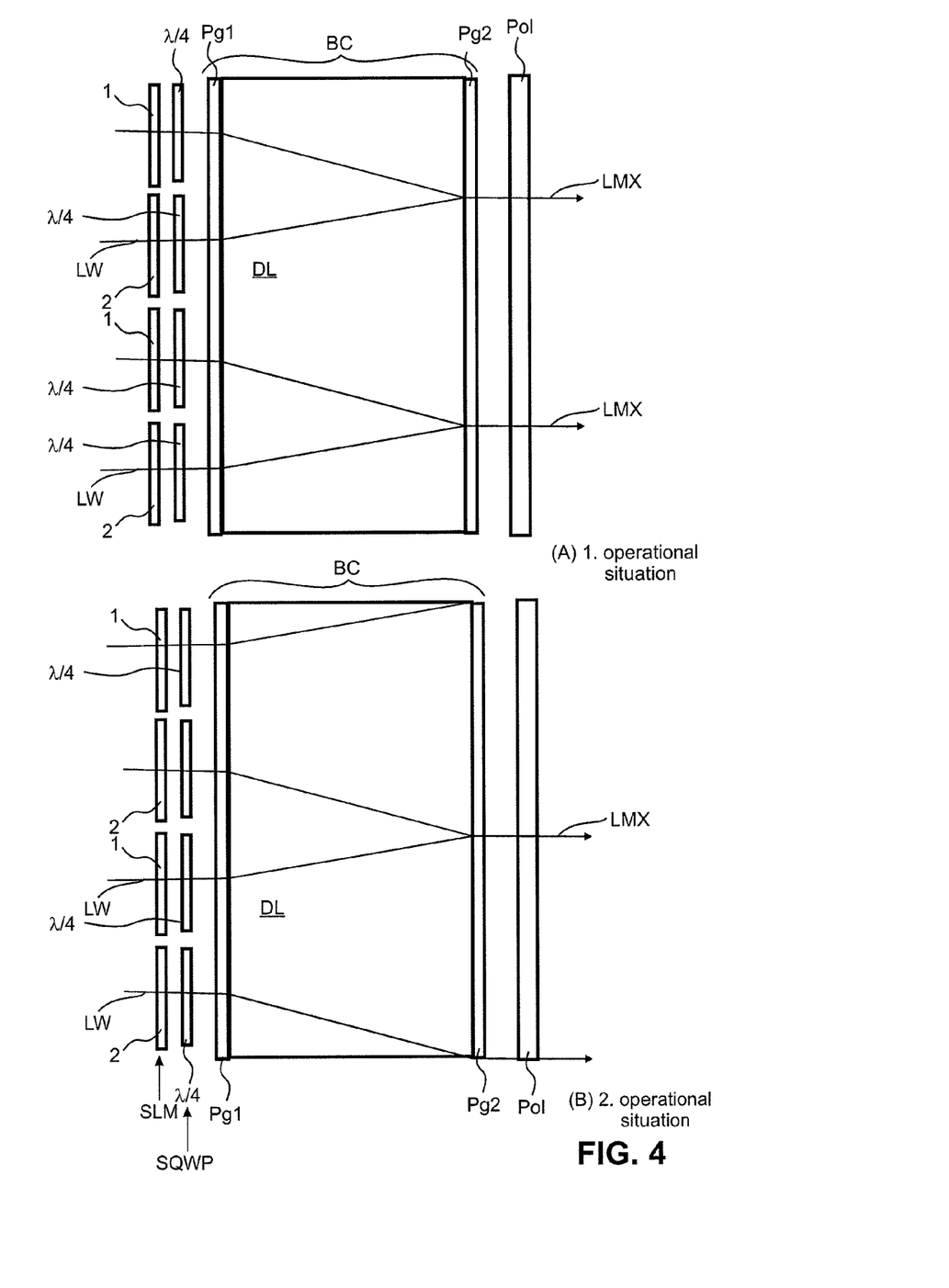
Figure 5:
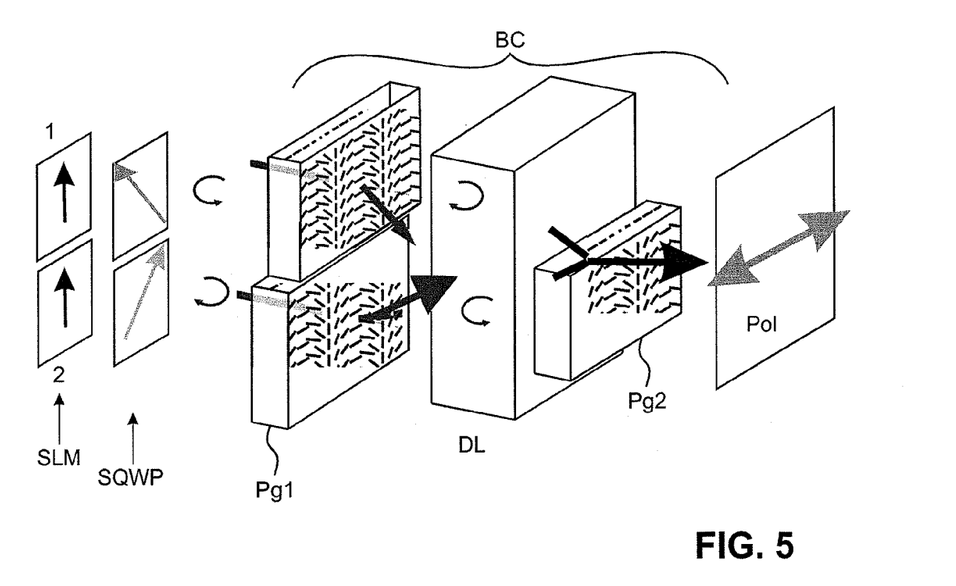

In FIGS. 3-5, the optical properties of the deflection layers Vg1, Vg2, Vg3, Vg4, Pg1, Pg2 and, if any, of the provided retardation plates and/or the optical properties of the birefringent media SP, SP1, SP2 and SP3 are chosen such that the beam deflection, if any, is oriented in a direction which substantially lies in the drawing plane of the respective figure. However, other configurations of the optical properties of involved components are possible, where beams may also be deflected in a direction which is oriented out of the drawing plane of the respective figure. Insofar, a modulated light wave multiplex LMX of a modulation element does not only leave the light wave multiplexing means BC with a lateral offset in one direction (e.g. along a column of modulator cells), but with a lateral offset in a first and in a second direction.

The light wave multiplexing means BC according to FIGS. 3-5 each have a first deflection layer Vg1, Pg1. The first deflection layer Vg1, Pg1 is followed in the direction of light propagation by a second deflection layer Vg2, Pg2 at a specifiable distance d.

Referring to FIG. 3, the optical property of the first deflection layer Vg1 is chosen such that the light which passes through modulator cell 2 is substantially not deflected while the light which passes through modulator cell 1 is deflected by a first specifiable angle α1. The optical property of the second deflection layer Vg2 is chosen such that the light which passes through modulator cell 2 is substantially not deflected while the light which passes through modulator cell 1 is deflected by a second specifiable angle α2, where the absolute value of the second specifiable angle α2 is substantially identical to the absolute value of the first specifiable angle α1. Consequently, the light wave multiplexing means BC in FIG. 3 gives the light which is modulated by modulator cell 1 a lateral offset such that this light is superimposed with the light which is modulated by modulator cell 2, in particular such that the two light portions substantially propagate in the same direction.

Referring to FIG. 4, the optical property of the first deflection layer Pg1 is chosen such that the light which passes through the first modulator cell 1 is deflected by a first specifiable angle α1 into a first direction while the light which passes through the second modulator cell 2 is deflected by a second specifiable angle α2 into a second direction. The optical property of the second deflection layer Pg2 is chosen such that the light which passes through the first modulator cell 1 is deflected by the second angle α2 while the light which passes through the second modulator cell 2 is deflected by the first angle α1, where the absolute value of the first angle α1 is substantially identical to the absolute value of the second angle α2. Alternatively, the optical property of the second deflection layer Pg2 could be chosen such that the light which passes through the first modulator cell 1 is deflected by the first angle α1 (in the opposite direction) while the light which passes through the second modulator cell 2 is deflected by the second angle α2 (in the opposite direction), where the absolute value of the first angle α1 is substantially identical to the absolute value of the second angle α2. This is illustrated in the first operational situation of the light modulator device shown in the top drawing of FIG. 4. In the second operational situation of the light modulator device shown in the bottom drawing of FIG. 4, the polarisation of the incident light wave field LW is changed accordingly, so that the light which leaves the respective modulator cells 1, 2 and which passes through the light wave multiplexing means BC is generally deflected in the same way as in the first operational situation. However, in the second operational situation, the light wave multiplex LMX is formed by a different pair of modulator cells, as can be seen in FIG. 4.

FIG. 5 is a schematic perspective view which generally illustrates the embodiment of FIG. 4. Two pixels (addressable modulator cells 1, 2), which emit linear polarised light (vertical arrows), are followed by a structured λ/4 layer (the structured polariser means SQWP), which is drawn in the form of individual squares to make things clearer in the drawing, but which is in fact designed in the form of a continuous optical component. The optical axis is turned by +45 degrees at the one pixel 1 and by −45 degrees at the other pixel 2, always related to the direction of polarisation of the light which leaves the spatial light modulator SLM (indicated by the grey arrows in SQWP). The λ/4 layer converts the light into circular polarised light (indicated by the circular arrows in the drawing). According to the embodiment shown in FIG. 5, a first polarisation grating Pg1 of the light wave multiplexing means BC deflects the light according to its polarisation. Once the light has passed a spacer DL (thin glass plate or polymer film) of suitable thickness and once it is spatially superimposed, it is deflected in opposite directions by a second polarisation grating Pg2 of the light wave multiplexing means BC, so that the light portions which come from the two pixels 1, 2 leave parallel. A linear polariser Pol with either less than 0° or 90° direction of polarisation is disposed downstream of those elements. Polarisation gratings have the property of changing the direction of rotation of the circular polarisation, i.e. from right-handed circular to left-handed circular and vice versa (which is also indicated in the drawing). This property is very advantageous for the application as a beam combiner, because it allows the use of two gratings of the same kind (i.e. with identical orientation of the molecules in the grating) in the arrangement. Circular polarised light is deflected by the first grating Pg1 while changing the direction of rotation of its polarisation, and is thus deflected in the opposite direction by the second grating Pg2 of the same kind. Two gratings Pg1, Pg2 of the same kind which are disposed one after another in the optical path thus cause the desired parallel offset and beam combination. For reasons of clarity, the first polarisation grating Pg1 is drawn in the form of two block-shaped components. However, the first polarisation grating Pg1 is in fact designed in the form of a continuous optical component.

Figure 6:
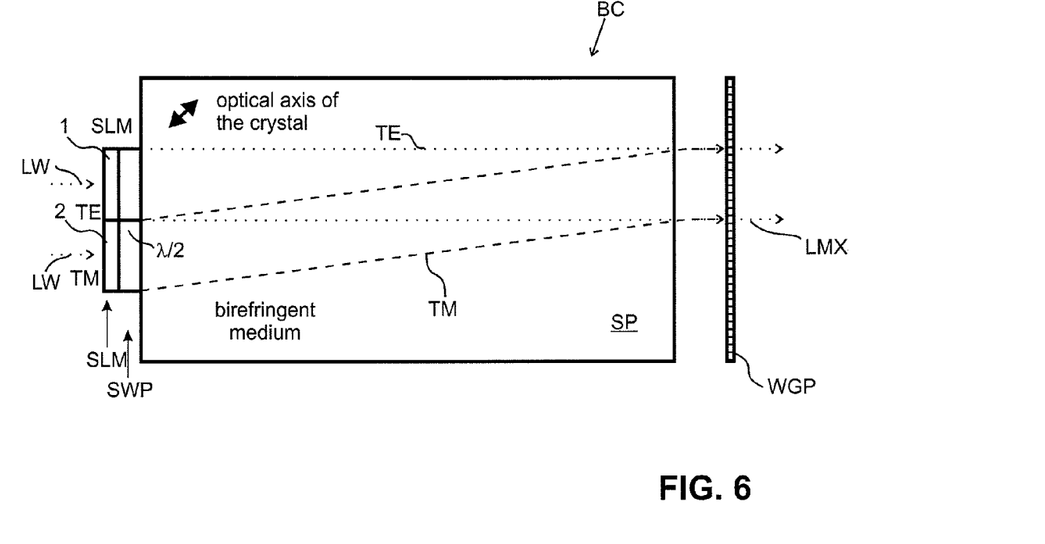
Figure 7:
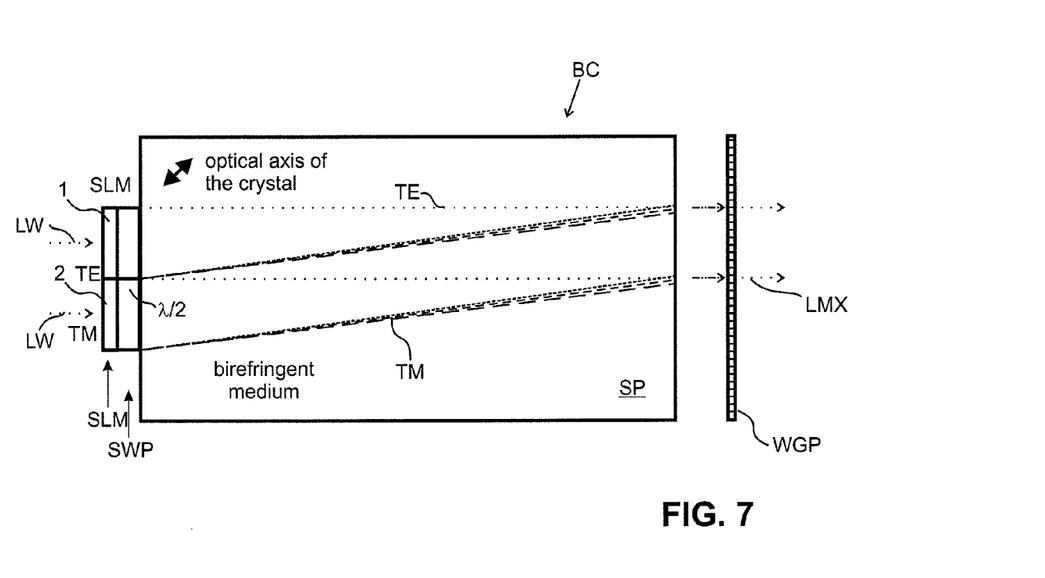
Figure 8:
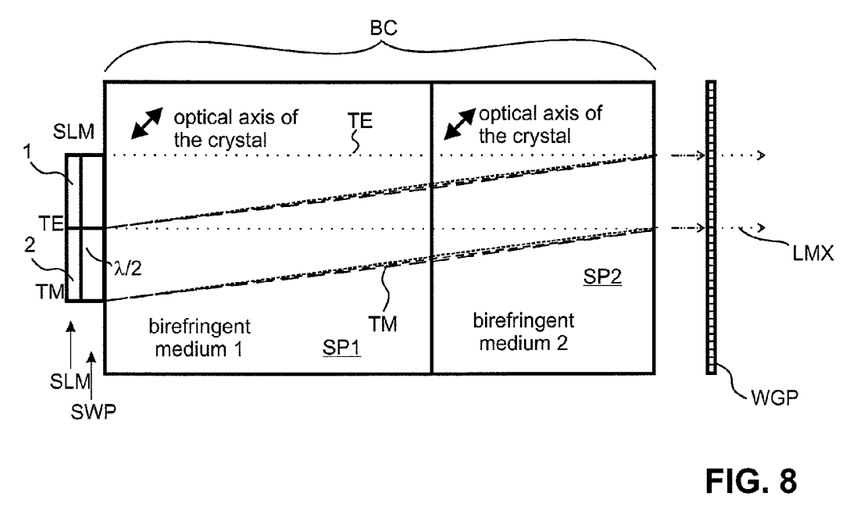

FIGS. 6 and 7 illustrate another embodiment of a light wave multiplexing means BC. The light wave multiplexing means BC comprises a birefringent medium SP in the form of a coplanar birefringent plate or layer which is designed and arranged for example as regards the optical axis of its crystal such that the light which passes through a first modulator cell 1 is substantially not deflected while the light which passes through a second modulator cell 2 leaves the birefringent medium SP with a lateral offset, so that the light portions are combined on its exit side to form a modulated light wave multiplex LMX such that the modulated light wave multiplex LMX leaves the birefringent medium SP substantially through a common point and substantially in the same direction of propagation. Referring to FIG. 7, light with different wavelengths is coupled into the light wave multiplexing means BC and deflected into slightly different directions due to the effect of dispersion. This may bring about undesired chromatic errors. In order to prevent this effect, according to the embodiment of the light wave multiplexing means BC shown in FIG. 8, the birefringent medium SP1 with a normal or anomalous dispersion is followed in the direction of light propagation by another birefringent medium SP2 with an anomalous or normal dispersion, i.e. a respectively opposite dispersion. The thickness ratio of the two birefringent media SP1, SP2 is then specifiable and preferably depends on the ratio of the refractive index differences of the two birefringent media SP1, SP2 between a specifiable wavelength of the light, e.g. green, and at least one further specifiable wavelength of the light, e.g. red and blue.

Figure 9:
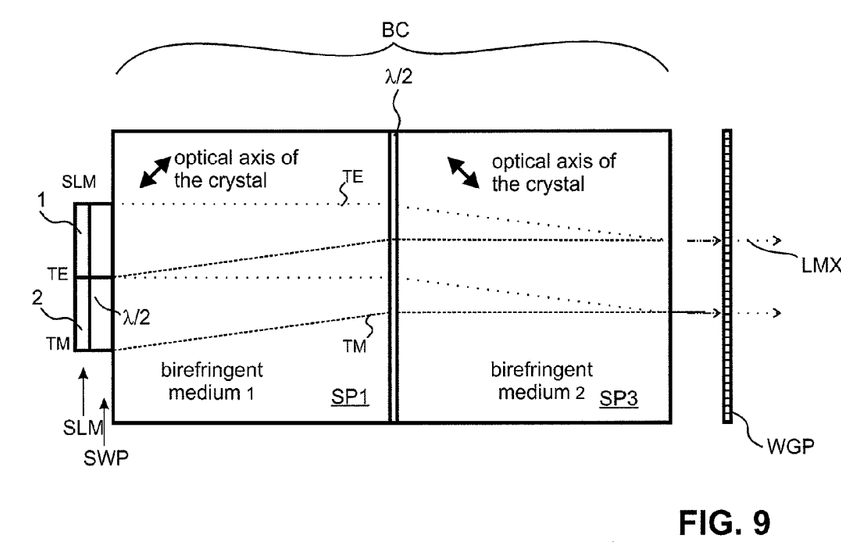

FIG. 9 shows another embodiment of a light wave multiplexing means, where the birefringent medium SP1 is followed in the direction of light propagation by another birefringent medium SP3. The birefringent medium SP1 is designed and arranged such that the light which passes through a first modulator cell 1 is substantially not deflected while the light which passes through a second modulator cell 2 leaves the birefringent medium SP1 with a lateral offset. The further birefringent medium SP3 is designed and arranged such that the light which passes through the second modulator cell 2 is substantially not deflected while the light which passes through the first modulator cell 1 leaves the birefringent medium SP3 with a lateral offset, so that the light portions are combined on the exit side of the further birefringent medium SP3 to form a modulated light wave multiplex LMX such that the modulated light wave multiplex LMX leaves the further birefringent medium SP3 substantially through a common point and substantially in the same direction of propagation. The further birefringent medium SP3 could have a dispersion which is suitable for chromatic correction of the light which passes through the two birefringent media SP1, SP3.

The birefringent media SP, SP1, SP2, SP3 which are shown in FIGS. 6-9 have substantially coplanar interfaces. A retardation plate in the form of a λ/2 plate is disposed between the two birefringent media SP1 and SP3 of the light wave multiplexing means BC in FIG. 9, said plate turning the direction of polarisation of the light which passes through this plate by 90 degrees. The optical axes of SP1 and SP2 (indicated by double arrows) are oriented at right angles.

The birefringent medium SP, SP2, SP3 of the light wave multiplexing means BC which are shown in FIGS. 6-9 are each followed in the direction of light propagation by a polarisation means WGP (wire grid polariser) of a specifiable optical property, which serves as an analyser.

Referring to FIG. 3, a λ/2 plate is drawn between the modulator cell 2 and the volume grating Vg1. Providing a λ/2 plate becomes necessary when the light which falls on the modulator cells 1,2 only has one specifiable polarisation, e.g. a linear TE polarisation. In that case, the polarisation of the light which passes through the modulator cell 2 is turned by the λ/2 plate by 90 degrees, so that the light which passes through the modulator cell 1 is given a polarisation that is perpendicular to that of the light which passes through the modulator cell 2. If the light which falls on the modulator cells 1, 2 already has a perpendicular polarisation, the provision of a λ/2 plate between the modulator cell 2 and the volume grating Vg1 is not necessary. In other words, it is important that the light which passes through the modulator cell 1 has a different—e.g. perpendicular—polarisation than the light which passes through the modulator cell 2, so that the light which passes through one modulator cell is deflected by the volume grating Vg1, and the light which passes through the other modulator cell is not deflected by the volume grating Vg1. What has been said above also applies to FIGS. 6-9 in a similar way.

Figure 10:
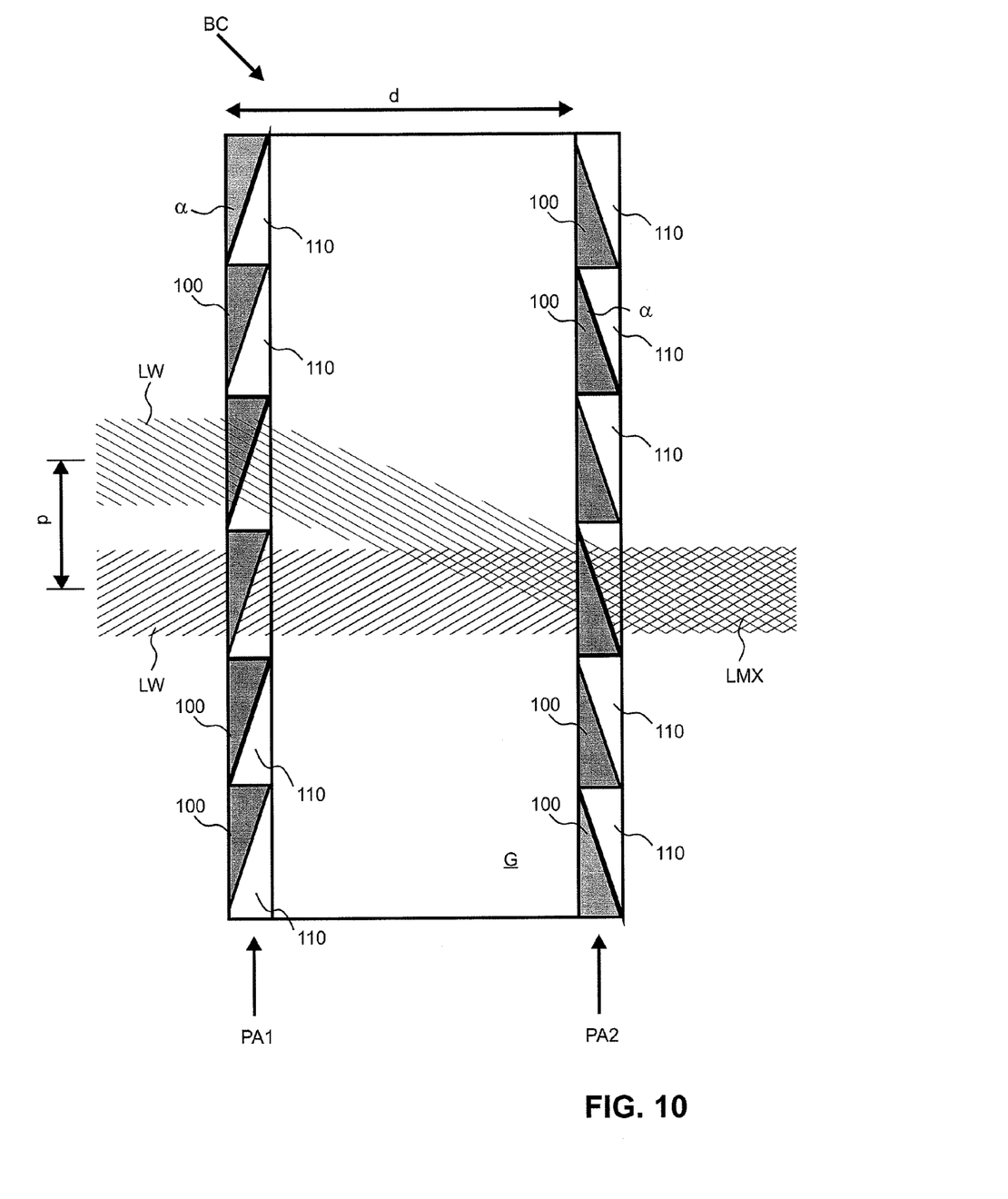

FIG. 10 shows another embodiment of a light wave multiplexing means BC, where the light wave multiplexing means BC comprises a first birefringent prism array PA1 and a second birefringent prism array PA2. The first birefringent prism array PA1 is designed and arranged such that the light LW1 which passes through a first modulator cell can be deflected into a first direction. The light LW2 which passes through a second modulator cell is not deflected. The first birefringent prism array PA1 is followed in the direction of light propagation by the second birefringent prism array PA2 at a specifiable distance d. The second birefringent prism array PA2 is designed and arranged such that the light which has been deflected by the first birefringent prism array PA1 is deflected by the second birefringent prism array PA2 into a specifiable direction. The light which has not been deflected by the first birefringent prism array PA1 is not deflected by the second birefringent prism array PA2 either.

Referring to FIG. 10, the birefringent prism arrays PA1, PA2 are designed as follows: A birefringent material 100 arranged in the form of a prism and a second, non-birefringent material 110, for example glass, are arranged one after another in the optical path such that their combination results in a coplanar layer, namely a prism array PA1 and PA2, respectively.

One refractive index, for example the ordinary refractive index, of the birefringent material 100 is chosen such that it is about the same as the refractive index of the second material 110. As for this refractive index, the interface between the two materials 100, 110 thus has no optical effect. Light which is polarised such that the effective refractive index for the optical path through the two materials 100, 110 is this refractive index is thus not deflected. As for a different refractive index, for example the extraordinary refractive index, of the birefringent material 100, there is a difference to the refractive index of the second material 110 and thus an optically effective interface between the two materials 100, 110. Light which is polarised such that the effective refractive index for the optical path through the two materials 100, 110 is this refractive index is thus deflected.

For example, the first birefringent prism array PA1 can comprise identical prisms for all modulator cells (not shown in FIG. 10). The controllable polarisation means and the structured polariser means (not shown either in FIG. 10) then adjust the polarisation such that light is deflected by the prism arrays PA1, PA2 for certain modulator cells but that it is not deflected for other modulator cells.

Finally, it must be said that the embodiments described above shall solely be understood to illustrate the claimed teaching, but that the claimed teaching is not limited to these embodiments.

The invention claimed is:

1. Light modulator device comprising a spatial light modulator, a structured polarizer, a controllable polarizer and a light wave multiplexer, where the spatial light modulator comprises discretely addressable modulator cells, where two modulator cells each are combined to form a modulation element, where the modulator cells modulate light waves which are capable of generating interference of a propagating light wave field with holographic information in a spatially structured way such that a specifiable spatial distribution of object light points of a three-dimensional scene is holographically reconstructed, where the modulator cells of each modulation element are adjacently arranged regarding the direction of propagation of the light wave field, where the light which is modulated by adjacently arranged modulator cells are given different polarization states by the structured polariser, where the light wave multiplexer is disposed and designed such that the different light wave portions—after having been modulated by the modulator cells and having different polarisation states—are combined on the exit side to form a modulated complex-valued light wave multiplex such that the modulated light wave multiplex leaves the light wave multiplexer substantially through a common point and substantially in the same direction of propagation, wherein in a first operational situation of the controllable polarizer light wave portions of two adjacent modulator cells are combined by the light wave multiplexer, whereas in a second operational situation of the controllable polarizer light wave portions of two other adjacent modulator cells are combined by the light wave multiplexer, where said two other adjacent modulator cells are offset by one modulator cell from the two adjacent modulator cells.

2. The light modulator device according to claim 1, wherein the light wave field which illuminates the light modulator device is polarised and that the structured polarizer is designed such that it realises the optical function of a retardation plate or, a $\lambda/2$ plate or $\lambda/4$ plate, at least for a first portion of the light which is modulated by the adjacently arranged modulator cells.

3. The light modulator device according to claim 1, wherein the structured polarizer gives the light which passes through a first modulator cell a specifiable first polarisation and the light which passes through a second modulator cell a specifiable second polarisation, where the specifiable first polarisation is linear and perpendicular to the specifiable second, linear polarisation, or where the specifiable first polarisation is circular and has an opposite direction of rotation as the specifiable second, circular polarisation.

4. The light modulator device according to claim 1, wherein the light wave field which illuminates the light modulator device is linear or circular polarised.

5. The light modulator device according to claim 1, wherein the controllable polarizer comprises an optical component based on liquid crystals which gives the light which interacts with the controllable polarizer a specifiable polarisation.

6. The light modulator device according to claim 1, wherein the light wave multiplexer comprises a birefringent medium or a coplanar birefringent plate or a coplanar birefringent layer which is designed and arranged such that the light which passes through a first modulator cell is substantially not deflected while the light which passes through a second modulator cell leaves the birefringent medium with a lateral offset, so that the light portions are combined on its exit side to form a modulated light wave multiplex such that the modulated light wave multiplex leaves the birefringent medium substantially through a common point and substantially in the same direction of propagation.

7. The light modulator device according to claim 6, wherein the birefringent medium is followed in the direction of light propagation by another birefringent medium, that the birefringent medium is designed and arranged such that the light which passes through a first modulator cell is substantially not deflected while the light which passes through a second modulator cell leaves the birefringent medium with a lateral offset, and that another birefringent medium is designed and arranged such that the light which passes through the second modulator cell is substantially not deflected while the light which passes through the first modulator cell leaves said another birefringent medium with a lateral offset, so that the light portions are combined on the exit side of said another birefringent medium to form a modulated light wave multiplex such that the modulated light wave multiplex leaves the birefringent medium substantially through a common point and substantially in the same direction of propagation.

8. The light modulator device according to claim 6, wherein the birefringent medium is followed by another birefringent medium having a dispersion which is suitable for chromatic correction.

9. The light modulator device according to claim 7, wherein the at least two birefringent media have substantially coplanar interfaces or that a retardation plate or a $\lambda/2$ plate is disposed between the two birefringent media.

10. The light modulator device according to claim 1, wherein the light wave multiplexer comprises a first deflection layer and that the first deflection layer is followed in the direction of light propagation by a second deflection layer at a specifiable distance.

11. The light modulator device according to claim 10, wherein the optical property of the first deflection layer is chosen such that the light which passes through the first modulator cell is substantially not deflected while the light which passes through the second modulator cell is deflected by a first specifiable angle and that the optical property of the second deflection layer is chosen such that the light which passes through the first modulator cell is substantially not deflected while the light which passes through the second modulator cell is deflected by a second specifiable angle, where the absolute value of the second specifiable angle could be substantially identical to the absolute value of the first specifiable angle.

12. The light modulator device according to claim 10, wherein the optical property of the first deflection layer is chosen such that the light which passes through the first modulator cell is deflected by a first specifiable angle into a first direction while the light which passes through the second modulator cell is deflected by a second specifiable angle into a second direction, that the optical property of the second deflection layer is chosen such that the light which passes through the first modulator cell is deflected by the second angle while the light which passes through the second modulator cell is deflected by the first angle and that the absolute value of the first angle could be substantially identical to the absolute value of the second angle.

13. The light modulator device according to claim 1, wherein the light wave multiplexer comprises a first birefringent prism array and a second birefringent prism array, that the first birefringent prism array is designed and arranged such that the light which passes through a first modulator cell is deflected into a first direction, that the light which passes through a second modulator cell is not deflected, that the first birefringent prism array is followed in the direction of light propagation by the second birefringent prism array at a specifiable distance, that the second birefringent prism array is designed and arranged such that the light which is deflected by the first birefringent prism array is deflected by the second birefringent prism array into a specifiable direction, and that the light which has not been deflected by the first birefringent prism array is not deflected by the second birefringent prism array either.

14. The light modulator device according to claim 10, wherein a deflection layer is a layer that comprises at least one of the following: a hologram and a volume grating and a Bragg grating and a polarisation grating.

15. The light modulator device according to claim 1, wherein two vertically adjacent modulator cells each are combined to form a modulation element such that a line of modulation elements is created or wherein two horizontally adjacent modulator cells each are combined to form a modulation element such that a column of modulation elements is created.

16. The light modulator device according to claim 1, wherein the controllable polarizer is disposed upstream of the light wave multiplexer in the direction of light propagation or that the structured polarizer is disposed upstream of the light wave multiplexer in the direction of light propagation.

17. The light modulator device according to claim 1, wherein the controllable polarizer is disposed upstream or downstream of the structured polariser in the direction of light propagation.

18. The light modulator device according to claim 1, wherein the controllable polarizer can be brought to the first operational situation for the duration of one frame and that the controllable polarizer can be brought to the second operational situation for the duration of the subsequent frame.

19. The light modulator device according to claim 18, wherein information is written to the spatial light modulator depending on the actual operational situation of the controllable polarizer.

20. The light modulator device according to claim 1, wherein the structured polarizer is of a controllable type, thus taking over the function of the controllable polarizer.

21. The light modulator device according to claim 1, wherein the light wave multiplexer is followed in the direction of light propagation by a polarizer with specifiable optical property, which serves as an analyser.

22. The light modulator device according to claim 7, wherein said another birefringent medium has a dispersion which is suitable for chromatic correction of the light which passes through the two birefringent media.

* * * * *